US012244111B2

(12) United States Patent
Muth et al.

(10) Patent No.: US 12,244,111 B2
(45) Date of Patent: Mar. 4, 2025

(54) FABRIC-CONTACT DEVICE, SYSTEM, IN PARTICULAR HEATING SYSTEM FOR A MOTOR VEHICLE, AND METHOD FOR PRODUCING SUCH A SYSTEM

(71) Applicant: TE Connectivity Germany GmbH, Bensheim (DE)

(72) Inventors: Christopher Muth, Langen (DE); Uwe Bluemmel, Hemsbach (DE); Marcel Baltes, Floersheim (DE)

(73) Assignee: TE Connectivity Germany GmbH, Bensheim (DE)

( * ) Notice: Subject to any disclaimer, the term of this patent is extended or adjusted under 35 U.S.C. 154(b) by 1048 days.

(21) Appl. No.: 17/181,516

(22) Filed: Feb. 22, 2021

(65) Prior Publication Data

US 2021/0175641 A1 Jun. 10, 2021

Related U.S. Application Data

(63) Continuation of application No. PCT/EP2019/072027, filed on Aug. 16, 2019.

(30) Foreign Application Priority Data

Aug. 22, 2018 (DE) ..................... 10 2018 120 473.6

(51) Int. Cl.
*H01R 4/18* (2006.01)
*H01R 43/048* (2006.01)
(Continued)

(52) U.S. Cl.
CPC ........... *H01R 4/182* (2013.01); *H01R 43/048* (2013.01); *H05B 3/06* (2013.01); *H05B 3/347* (2013.01);
(Continued)

(58) Field of Classification Search
CPC .......... H05B 3/347; H05B 3/06; H05B 3/345; H05B 2203/029; H05B 2203/017;
(Continued)

(56) References Cited

U.S. PATENT DOCUMENTS 5,422,462 A * 6/1995 Kishimoto ........... H05B 1/0272 219/545
8,535,080 B2 9/2013 Nakatsuji et al.
(Continued)

FOREIGN PATENT DOCUMENTS

CN 103199361 A 7/2013
JP 2001291536 A 10/2001
(Continued)

OTHER PUBLICATIONS

PCT Notification of Transmittal, The International Search Report and The Written Opinion, dated Oct. 24, 2019, 13 pages.
(Continued)

*Primary Examiner* — Dana Ross
*Assistant Examiner* — Kuangyue Chen
(74) *Attorney, Agent, or Firm* — Barley Snyder

(57) ABSTRACT

A fabric-contact device includes a first contact section having a first contact face on a first upper side, a second contact section having a second contact face on an underside facing the first contact section, and a retaining device. The first contact face faces the second contact section and the first contact section is connected to the second contact section on a first side of the first contact section. The retaining device has a first retaining element connected to a second side of the first contact section at a first fixed end. The first retaining element is guided laterally past the second contact section by a first section of the first retaining element bordering the first fixed end. A second section of the first retaining element bordering the first section on a side
(Continued)

opposite the first fixed end engages behind the second contact section and affixes the second contact section to the first contact section.

24 Claims, 10 Drawing Sheets

(51) Int. Cl.

| | |
|---|---|
| ***H05B 3/06*** | (2006.01) |
| ***H05B 3/34*** | (2006.01) |
| *H01R 4/58* | (2006.01) |

(52) U.S. Cl.
CPC ............ *H01R 4/58* (2013.01); *H01R 2201/26* (2013.01); *H05B 2203/016* (2013.01); *H05B 2203/017* (2013.01); *H05B 2203/029* (2013.01)

(58) Field of Classification Search
CPC ......................... H05B 2203/016; H01R 4/182; H01R 43/048; H01R 4/64; H01R 4/16; H01R 2201/26; H01R 4/58
See application file for complete search history.

(56) References Cited

U.S. PATENT DOCUMENTS

| | | | | |
|---|---|---|---|---|
| 9,071,014 | B2 | 6/2015 | Akaike et al. | |
| 2013/0189870 | A1 * | 7/2013 | Akaike ................ | H01R 13/627 439/345 |
| 2018/0298579 | A1 * | 10/2018 | Ouyang .................... | E02D 5/54 |
| 2019/0089072 | A1 | 3/2019 | Morita et al. | |

FOREIGN PATENT DOCUMENTS

| | | | |
|---|---|---|---|
| JP | 2012169051 | A | 9/2012 |
| JP | 2013157307 | A | 8/2013 |
| WO | 2017159691 | A1 | 9/2017 |
| WO | 201855777 | A1 | 3/2018 |

OTHER PUBLICATIONS

Japanese Office Action and English Translation thereof, Application No. 2021-508319, Dated: Apr. 26, 2022, 7 pages.
Office Action from the Korean Intellectual Property Office dated Jan. 27, 2023, corresponding to Application No. 10-2021-7008149 with English translation, 9 pages.
Chinese First Office Action with English translation, Application No. 201980055282.6, Dated: Aug. 5, 2022, 14 pages.

* cited by examiner

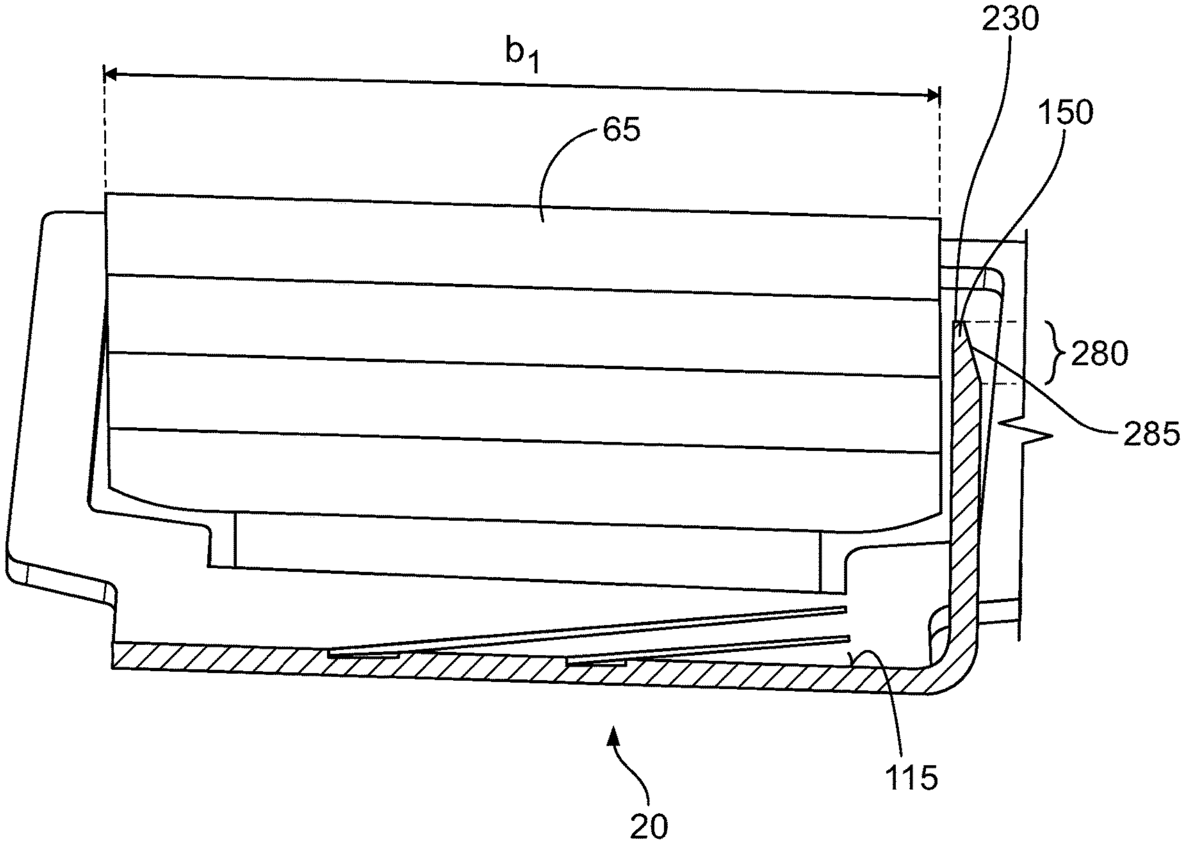
B-B
Fig. 5
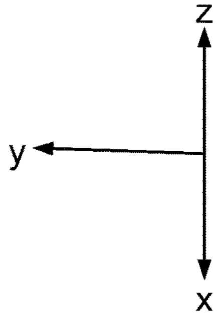

FABRIC-CONTACT DEVICE, SYSTEM, IN PARTICULAR HEATING SYSTEM FOR A MOTOR VEHICLE, AND METHOD FOR PRODUCING SUCH A SYSTEM

CROSS-REFERENCE TO RELATED APPLICATIONS

This application is a continuation of PCT International Application No. PCT/EP2019/072027, filed on Aug. 16, 2019, which claims priority under 35 U.S.C. § 119 to German Patent Application No. 102018120473.6, filed on Aug. 22, 2018.

FIELD OF THE INVENTION

The present invention relates to a fabric-contact device and, more particularly, to a system having the fabric-contact device.

BACKGROUND

Heating systems for a motor vehicle are known. The heating systems have a fabric, which comprises two electrodes. An electrical cable for contacting is soldered onto the electrodes. The soldering operation, however, is complex and sets high requirements for process safety.

SUMMARY

A fabric-contact device includes a first contact section having a first contact face on a first upper side, a second contact section having a second contact face on an underside facing the first contact section, and a retaining device. The first contact face faces the second contact section and the first contact section is connected to the second contact section on a first side of the first contact section. The retaining device has a first retaining element connected to a second side of the first contact section at a first fixed end. The first retaining element is guided laterally past the second contact section by a first section of the first retaining element bordering the first fixed end. A second section of the first retaining element bordering the first section on a side opposite the first fixed end engages behind the second contact section and affixes the second contact section to the first contact section.

BRIEF DESCRIPTION OF THE DRAWINGS

The invention will now be described by way of example with reference to the accompanying Figures, of which:

FIG. 5 is a sectional perspective view of the fabric-contact device, taken along plane B-B of FIG. 3;

DETAILED DESCRIPTION OF THE EMBODIMENT(S)

The accompanying drawings are incorporated into the specification and form part of the specification to illustrate several embodiments of the present invention. These drawings, together with the description, serve to explain the principles of the invention. The drawings are merely for the purpose of illustrating examples of how the invention can be made and used, and are not to be construed as limiting the invention to only the illustrated and described embodiments. Furthermore, several aspects of the embodiments may form—individually or in different combinations—solutions according to the present invention. The following described embodiments thus can be considered either alone or in an arbitrary combination thereof. Further features and advantages will become apparent from the following more particular description of the various embodiments of the invention, as illustrated in the accompanying drawings, in which like references refer to like elements.

In the figures described below, reference is made to a coordinate system to facilitate understanding. In this case, the coordinate system comprises an x axis (longitudinal direction), a y axis (transverse direction) and a z axis (vertical direction). The coordinate system is formed, by way of example, as a right-handed system.

Figure 1:
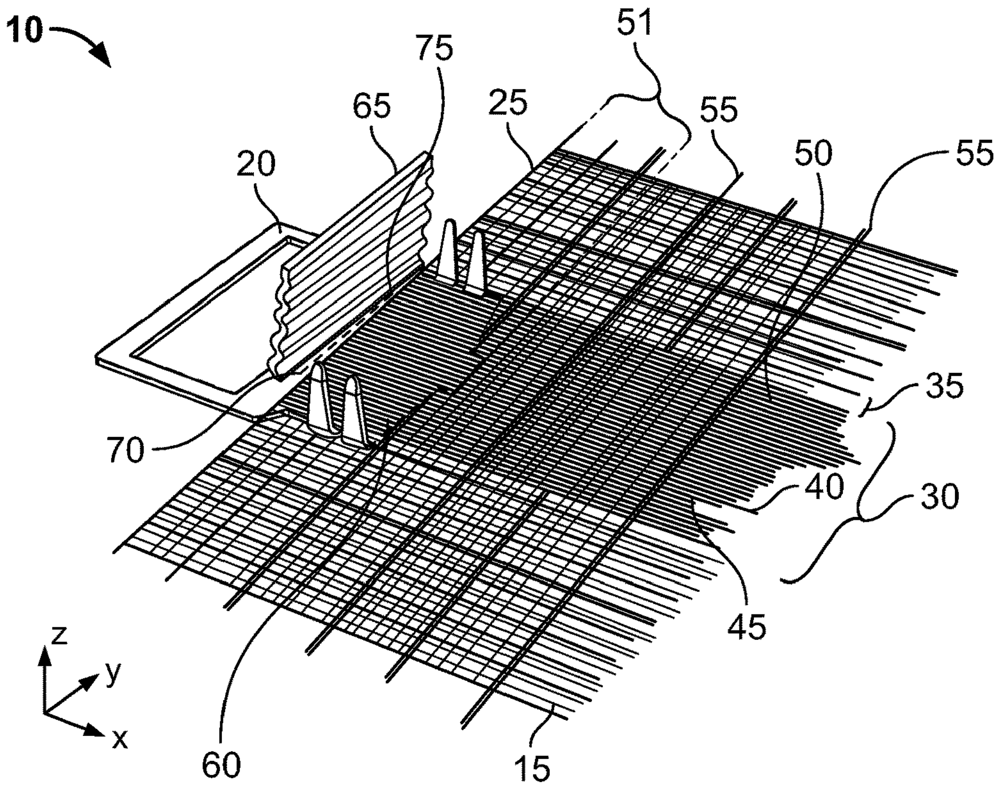
FIG. 1 is a perspective view of a system according to an embodiment.

A system 10 according to an embodiment is shown in FIG. 1. The system 10 can be formed as a heating system for a motor vehicle, in particular as seat heating. The system 10 has a fabric 15 and a fabric-contact device 20. The fabric 15 has an edge 25, which delimits the fabric 15. In the embodiment, the edge 25 extends in the y direction by way of example. The fabric 15 has a first fabric section 30 and at least one second fabric section 35.

The first fabric section 30 and the second fabric section 35, in the embodiment shown in FIG. 1, run parallel to one another and, in the embodiment, extend in the longitudinal direction by way of example. The first fabric section 30 is formed wider than the second fabric section 35 in the transverse direction. In this case, the second fabric section 35 is arranged laterally directly bordering the first fabric section 30 in the transverse direction.

As shown in FIG. 1, in the first fabric section 30, the fabric 15 has a first yarn 40 and a second yarn 45. The first yarn 40 has an electrically conductive substance. The first yarn 40 can have one or more wires, for example. The wire, in this case, has a small diameter, for example in a range of 0.02 mm to 0.08 mm. In the embodiment, the first yarn 40 has a diameter of 0.05 mm. The second yarn 45 has an electrically insulating substance, for example a plastic.

In the first fabric section 30, the first yarn 40 is interwoven with the second yarn 45 to form a first electrode 50. In this case, for example, the first yarn 40 can be interwoven substantially in the longitudinal direction, whereas the second yarn 45 is interwoven in the transverse direction. A different interweaving of the first yarn 40 with the second yarn 45 is also conceivable. In the embodiment shown in FIG. 1, the first electrode 50 extends as far as the edge 25 of the fabric 15. Adjoining the edge 25, the first electrode 50 has a first fabric-contact region 51.

The fabric 15, as shown in the embodiment of FIG. 1, has a first secondary electrode 55 or several first secondary electrodes 55. In the embodiment, the first secondary electrode 55 extends parallel to the y axis. The first secondary electrode 55 crosses the first electrode 50 and electrically contacts the first electrode 50. The first secondary electrode 55 can likewise be woven out of the first yarn 40 into the second yarn 45. In this case, the first secondary electrode 55 is formed to be significantly narrower in the longitudinal direction than the first electrode 50 is formed in the transverse direction. To form the first secondary electrode 55, the first yarn 40 can run in the transverse direction, for example. Several first secondary electrodes 55, arranged offset in the longitudinal direction and spaced apart from one another, are provided in an embodiment. The first secondary electrodes 55 are electrically insulated from one another by the second yarn 45 and are connected to one another only electrically by the first electrode 50.

The fabric-contact device 20, as shown in FIG. 1, has a first contact section 60 and a second contact section 65. In FIG. 1, the first contact section 60 is arranged below the fabric-contact region 51 of the first electrode 50, the fabric-contact region 51 bordering the edge 25. The second contact section 65 is connected to the first contact section 60 by a hinge 70. The second contact section 65 can be pivoted about a pivot axis 75 between a first position and a second position. The pivot axis 75 runs parallel to the edge 25 and, in the embodiment, extends in the y direction by way of example.

Figure 2:
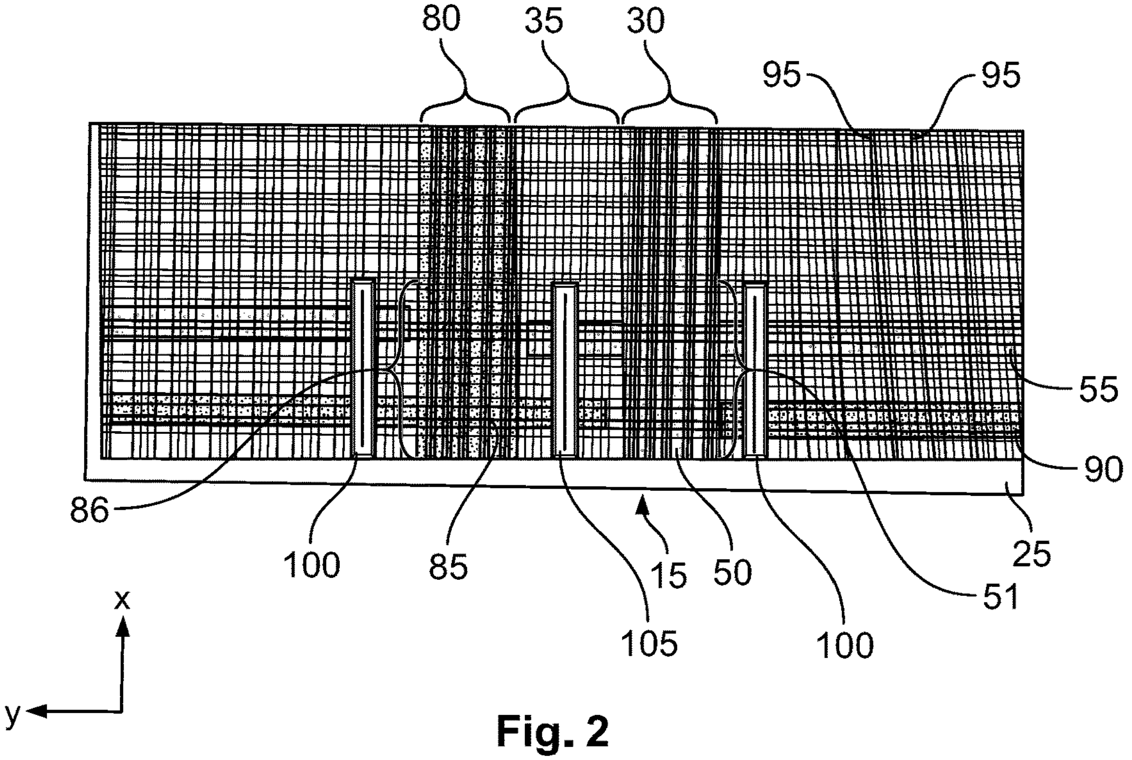
FIG. 2 is a plan view of a fabric of the system.

The fabric 15 has, as well as the first fabric section 30 and the second fabric section 35, a third fabric section 80 as shown in FIG. 2. The third fabric section 80 is arranged spaced apart from the first fabric section 30. The second fabric section 35 is arranged between the first fabric section 30 and the third fabric section 80.

To form a second electrode 85 shown in FIG. 2, the first yarn 40 is interwoven with the second yarn 45 in the third fabric section 80. In this case, the first yarn 40 of the third fabric section 80 is electrically disconnected from the first yarn 40 of the first fabric section 30 and is electrically insulated from the first fabric section 30 by the second fabric section 35. The second electrode 85 can have a second fabric-contact region 86, which borders the edge 25. In addition, the fabric 15 can have a second secondary electrode 90, the second secondary electrode 90 running parallel to the first secondary electrode 55. Thus, the first and second secondary electrodes 55, 90 extend in the y direction. In particular, a second secondary electrode 90 can in each case be arranged between two first secondary electrodes 55.

In this case, in the plan view shown in FIG. 2, the first secondary electrode 55 crosses with the first electrode 50 and the second electrode 85. In this case, the first secondary electrode 55, more precisely the first yarn 40 of the first secondary electrode 55, is interwoven with the second yarn 45 in such a way that the first secondary electrode 55 has no electrical contact to the second electrode 85 and is electrically insulated by the second yarn 45, in particular in a crossing region of the first secondary electrode 55.

The second secondary electrode 90 is likewise guided by the second electrode 85 in a crossing manner and is electrically connected to the second electrode 85. In a crossing region in the plan view shown in FIG. 2 of the second secondary electrode 90 with the first electrode 50, the first electrode 50 and the second secondary electrode 90 are electrically insulated from one another. More precisely, the first yarn 40 and the second yarn 45 are interwoven in such a way that, to form the second secondary electrode 90, the first yarn 40 has no electrical contact with the first yarn 40 to form the first electrode 50.

In addition, the fabric 15 has, by way of example, resistance electrodes 95 shown in FIG. 2 woven into the second yarn 45 at regular spacings, which resistance electrodes 95 have, for example, a plastic core enclosed by carbon. The individual resistance electrodes 95 are, in each case, arranged offset in relation to one another in the transverse direction and extend substantially in the longitudinal direction. In this case, the resistance electrodes 95 are borne by the second yarn 45. The resistance electrodes 95 are electrically connected to the secondary electrodes 55, 90. If the first electrode 50 and the second electrode 85 are electrically connected to an electrical power source, in this way a current circuit between the first electrode 50 and the second electrode 85 is closed via the first secondary electrode 55, the resistance electrode(s) 95 of the second secondary electrode 90 and via the second electrode 85. In this case, the resistance electrode 95 becomes heated and leads to a heating of the fabric 15. As a result, the fabric 15 is suitable in particular for forming the heating system in the motor vehicle, for example for heating seating areas or other surfaces, for example in an interior of a motor vehicle.

As shown in FIG. 2, at least one first notch 100 is arranged in the third fabric section 80, and in an embodiment, a first notch 100 and a second notch 105 are arranged on both sides of the electrode 50, 85 respectively. The notch 100, 105 extends substantially in the longitudinal direction. The notch 100, 105 is formed to be narrow and is introduced into the fabric 15, for example, by cutting into the fabric 15 in the production of the system 10. The notch 100, 105 can, however, also be introduced into the fabric 15 by a stamping method. This has the advantage that a width in the transverse direction of the notch 100, 105 can be chosen freely by the geometric configuration of the stamping tool. The notch 100, 105 is arranged spaced apart from the electrode 50, 85 in the transverse direction and can also cut through one or more secondary electrodes 55, 90.

In the first contact region 56 and/or in the second contact region 86, the second yarn 45 can be enclosed by a soldering agent. The soldering agent can have, for example, a fluxing agent and a solderable electrically conductive third substance. The third substance can have tin, for example.

Figure 3:
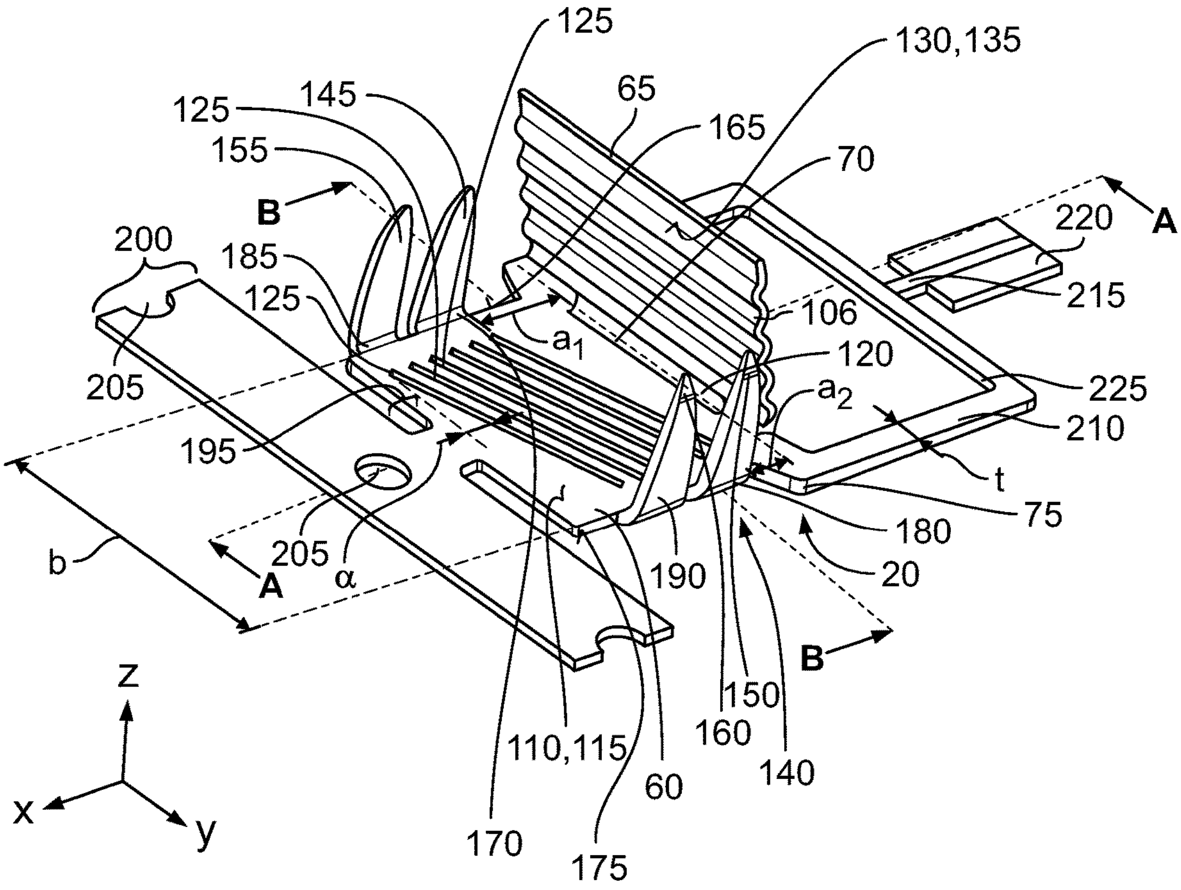
FIG. 3 is a perspective view of a fabric-contact device of the system.

The fabric-contact device 20 is shown in FIG. 3. The second contact section 65 is depicted in the second position in FIG. 3. In this case, the second contact section 65 is folded away from the first contact section 60 by the hinge 70. As a result, the second contact section 65 is arranged obliquely inclined in relation to the first contact section 60.

The first contact section 60 is formed in a plate-shaped manner and extends in an xy plane in FIG. 3. The first contact section 60 has a first contact face 115 on a first upper side 110. The first contact face 115 is formed in a substantially planar manner and, in the mounted state, bears against the underside of the fabric 15 in the first fabric-contact region 51. The first contact face 115 extends substantially over the entire first upper side 110. The first contact section 60 in this case has a rectangular configuration in the plan view. In this case, the first contact section 60 is connected to the hinge 70 on a first side 120, which extends in the y direction and can also be referred to as an end face. In the transverse direction, the hinge 70 is formed to be narrower, by way of example, than a first maximum extent b of the first contact section 60.

On the upper side, the first contact section 60 can have one or more groove-shaped first recesses 125 on the first contact face 115, as shown in FIG. 3. The first recess 125 is formed in a slim manner and extends substantially in the transverse direction. In this case, the first recess 125 is arranged, by way of example, at an angle α in relation to they axis and thus obliquely in relation to the pivot axis 75. The angle α, in an embodiment, has a value of 20° to 45°. In FIG. 3, by way of example, several first recesses 125 are arranged next to one another in the longitudinal direction. The first recesses 125 are arranged spaced apart and running parallel to one another. In another embodiment, it would also be conceivable for the first recesses 125 to cross one another or to have a different configuration. The first recess 125 is formed in a downwardly closed manner. In another embodiment, the first recess 125 can also be formed as a through-opening.

The second contact section 65 has a second contact face 135 on an underside 130. In FIG. 3, the second contact section 65 is depicted in the second position, folded away from the first contact section 60 about the pivot axis 75. The second contact section 65 is formed in a plate-shaped manner at least in sections. In addition, the second contact section 65 is provided with a wave profile 106. The wave profile 106 runs parallel to the pivot axis 75. The wave profile 106 is continuous and is thus displayed both on the upper side and on the underside of the second contact section 65. The wave profile 106 is formed evenly. In this case, the wave profile 106 is waved in such a way that, when the second contact section 65 is projected in the first position and when the first contact section 60 is projected in the z direction into an xy projection plane, the first recesses 125 and the wave profile 106 cross one another in the xy projection plane.

The fabric-contact device 20 has a retaining device 140, as shown in FIG. 3. The retaining device 140 is formed, in the first position of the second contact section 65, to connect the second contact section 65 to the first contact section 60 in a form-fitting manner and to prevent the second contact section 65 from bending up in the direction of the second position. In the embodiment shown in FIG. 3, the retaining device 140 has, by way of example, a first retaining element 145, a second retaining element 150, a third retaining element 155 and a fourth retaining element 160. The number of retaining elements 145, 150, 155, 160 is exemplary. Of course, a different number of retaining elements 145, 150, 155, 160 can also be chosen. In particular, it is sufficient to provide only one of the retaining elements 145, 150, 155, 160.

On a second side 165 of the first contact section 60, the first retaining element 145 is connected to the second side 165 of the first contact section 60 by a first fixed end 170, as shown in FIG. 3. In the embodiment, by way of example, the second side 165 is oriented at right angles to the first side 120 of the first contact section 60 and extends parallel to the x axis in the embodiment. Of course, the second side 165 could also be oriented obliquely in relation to the first side 120.

The second retaining element 150 is arranged on a third side 175 of the first contact section 60. The third side 175 is arranged opposite the second side 165. Furthermore, the first side 120 is arranged between the second side 165 and the third side 175 in the transverse direction. In the embodiment, the third side 175 and the second side 165 run in parallel, by way of example. In this case, the second retaining element 150 is connected to the third side 175 of the first contact section 60 by a second fixed end 180. The second retaining element 150 is arranged offset in relation to the first retaining element 145 in the longitudinal direction. In this case, a first minimum spacing a1 from the first fixed end 170 of the first retaining element 145 to the pivot axis 75 is greater than a second minimum spacing a2 from the second fixed end 180 of the second retaining element 150 to the pivot axis 75. The first retaining element 145 and the second retaining element 150 are, however, oriented in relation to one another in the longitudinal direction in such a way that, when projected in the y direction into an xz projection plane, the first retaining element 145 and the second retaining element 150 cover one another at least partially in the xz projection plane.

On the second side 165, by way of example, the third retaining element 155 is furthermore arranged offset in the longitudinal direction and spaced apart from the first retaining element 145, as shown in FIG. 3. The third retaining element 155 is connected to the second side 165 by a third fixed end 185.

The fourth retaining element 160 is connected to the third side 175 by a fourth fixed end 190. The fourth retaining element 160 is arranged offset in relation to the second retaining element 150 in the longitudinal direction. In this case, the third retaining element 155 and the fourth retaining element 160 are in each case arranged on a side of the first retaining element 145 and of the second retaining element 150 remote from the first side 120.

In the embodiment, the retaining elements 145, 150, 155, 160 are formed substantially identically to one another. In particular, the first retaining element 145 and the third retaining element 155 and the second retaining element 150 and the fourth retaining element 160 are formed identically to one another.

In the longitudinal direction, the fourth retaining element 160 is arranged between the first retaining element 145 and the third retaining element 155 when projected in the y direction into the xz projection plane. In the demounted state of the fabric-contact device 20, the retaining elements 145, 150, 155, 160 extend upwards perpendicular to the first contact face 115.

On a side remote from the first side 120, the first contact section 60 can be connected to a transport strip 200 via a connection section 195, as shown in FIG. 3, which is formed to be significantly narrower than the first and/or second contact section 60, 65 in the transverse direction. The transport strip 200 has at least one, and in an embodiment several second recesses 205, with which the transport strip 200 can be transported through a manufacturing machine. This configuration is suitable in particular for series manufacture of the system 10, in which the fabric-contact device 20 can be transported automatically via the transport strip 200. In this case, numerous fabric-contact devices 20 can be affixed to the transport strip 200. At the connection section 195, the fabric-contact device 20 is separated from the transport strip 200, for example by stamping.

Bordering the first side 120, the first contact section 60 is connected to an adjoining section 210, as shown in FIG. 3. The adjoining section 210 serves to contact an electrical conductor 215 of an electrical cable 220. The configuration of the adjoining section 210 is exemplary.

The fabric-contact device 20 can be electrically connected to the electrical power source by the electrical cable 220. The electrical conductor 215 can be electrically connected to the adjoining section 210, for example by a crimp connection or solder connection. A different electrical connection of the electrical conductor 215 to the adjoining section 210 is also conceivable. The adjoining section 210 can also be formed as a contact element, the adjoining section 210 being arranged as a contact element in the configuration, for example in a contact device, in order to provide an electrical connection to the electrical cable 220 with the contact device.

In an embodiment, the adjoining section 210 can be formed in a frame-shaped manner, as shown in FIG. 3. A different configuration of the adjoining section 210 is also conceivable. The adjoining section 210 is formed in a frame-like manner and circumferentially delimits a third recess 225, the second contact section 65 being bent out of the third recess 225. The adjoining section 210 has a frame width t, the frame width t being smaller than a second maximum extent t of the second recess 225 in the longitudinal direction and/or in the transverse direction.

Figure 4:
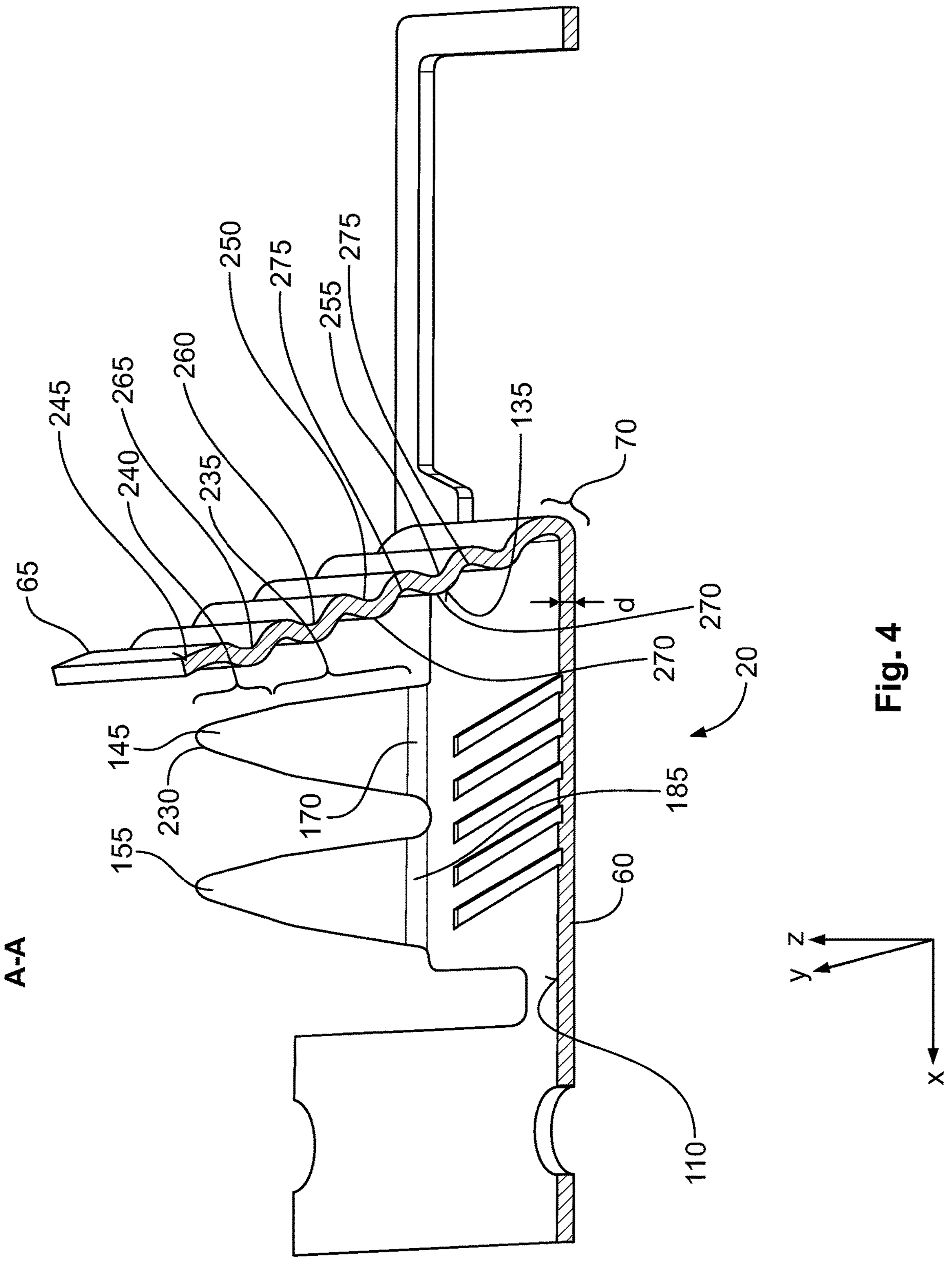
FIG. 4 is a sectional perspective view of the fabric-contact device, taken along plane A-A of FIG. 3.

As shown in FIG. 4, in an embodiment, a material thickness d of the fabric-contact device 20 is constant substantially over all the elements of the fabric-contact device 20 (with the first recess 125 in the embodiment). As a result, the fabric-contact device 20 can be formed in an integral and materially uniform manner and can be formed particularly inexpensively by a stamping and bending method, for example. In the embodiment, the material thickness d in the region of the hinge 70 is substantially identical to the material thickness d in the first contact section 60 and in the second contact section 65. Of course, it is also conceivable for the material thickness d to be chosen to be smaller, in particular in the region of the hinge 70, so that the hinge 70 is formed in the manner of a film hinge.

The retaining elements 145, 150, 155, 160 are formed substantially identically to one another. In this case, the retaining element 145, 150, 155, 160 tapers from the fixed end 170, 180, 185, 190 to a tip 230. The taper can be formed in two stages, as can be seen in FIG. 4, with the taper in a lower region 235, adjoining the fixed end 170, 180, 185, 190, first being formed flatter than in an upper region 240, which adjoins the tip 230 in a downward manner. In the upper region 235, the retaining element 145, 150, 155, 160 tapers more strongly to the tip 230. The tip 230 is formed in a rounded manner, by way of example. The retaining element 145, 150, 155, 160 can be guided particularly simply through a notch 100, 105 in the fabric 15, avoiding the yarn 40, 45 of the fabric 15 catching on the retaining element 145, 150, 155, 160 and interrupting a process for manufacturing the system 10 as a result.

The second contact section 65 has, on a second upper side 245 which is arranged on a side of the second contact section 65 remote from the first upper side 110, at least one first indentation 250 formed by the wave profile 106, as shown in FIG. 4. The second contact section 65 has, on the second upper side 245, an envisaged number of indentations 250, 255, 260, 265 at least corresponding to the number of retaining elements 145, 150, 155, 160. The indentations 250, 255, 260, 265 are formed by the wave profile 106 of the second contact section 65. Of course, the number of indentations 250, 255, 260, 265 can be unequal to the number of retaining elements 145, 150, 155, 160. In particular, the number of indentations 250, 255, 260, 265 can be greater than the number of retaining elements 145, 150, 155, 160.

The indentations 250, 255, 260, 265 extend in the y direction and are formed in an elongate manner. In this case, they run parallel to the pivot axis 75 and to the first side 120. The first to fourth indentation 250, 255, 260, 265 molds, in each case, a bulge 270 on the second contact face 135. A further indentation 275 is arranged in each case between the bulges 270 on the second contact face 135.

As shown in FIG. 5, the retaining element 145, 150, 155, 160 can have a bevel 285 in a further region 280, which adjoins the tip 230 of the retaining element 145, 150, 155, 160 on the underside. The bevel 285 tapers the retaining element 145, 150, 155, 160 to the tip 230 in the transverse direction. The further region 280 is formed to be shorter than the upper region 240 in the vertical direction. The bevel 285 can be arranged on a lateral face remote from the first contact face 115, as depicted on the second retaining element 150 in FIG. 5 by way of example. The bevel 285 can also be omitted or it can also be arranged on a side of the retaining element 145, 150, 155, 160 facing the first contact face 115.

A spacing in the transverse direction between the first and third retaining elements 145, 155 in relation to the second and fourth retaining elements 150, 160 is greater than a third maximum extent b1 of the second contact section 65, before the second contact section 65 is folded against the first contact section 60. The first maximum extent b can be identical to the third maximum extent b1. As a result, it is ensured that the second contact section 65 can be pivoted from the second position into the first position, without this abutting against the retaining element 145, 150, 155, 160.

Figure 6:
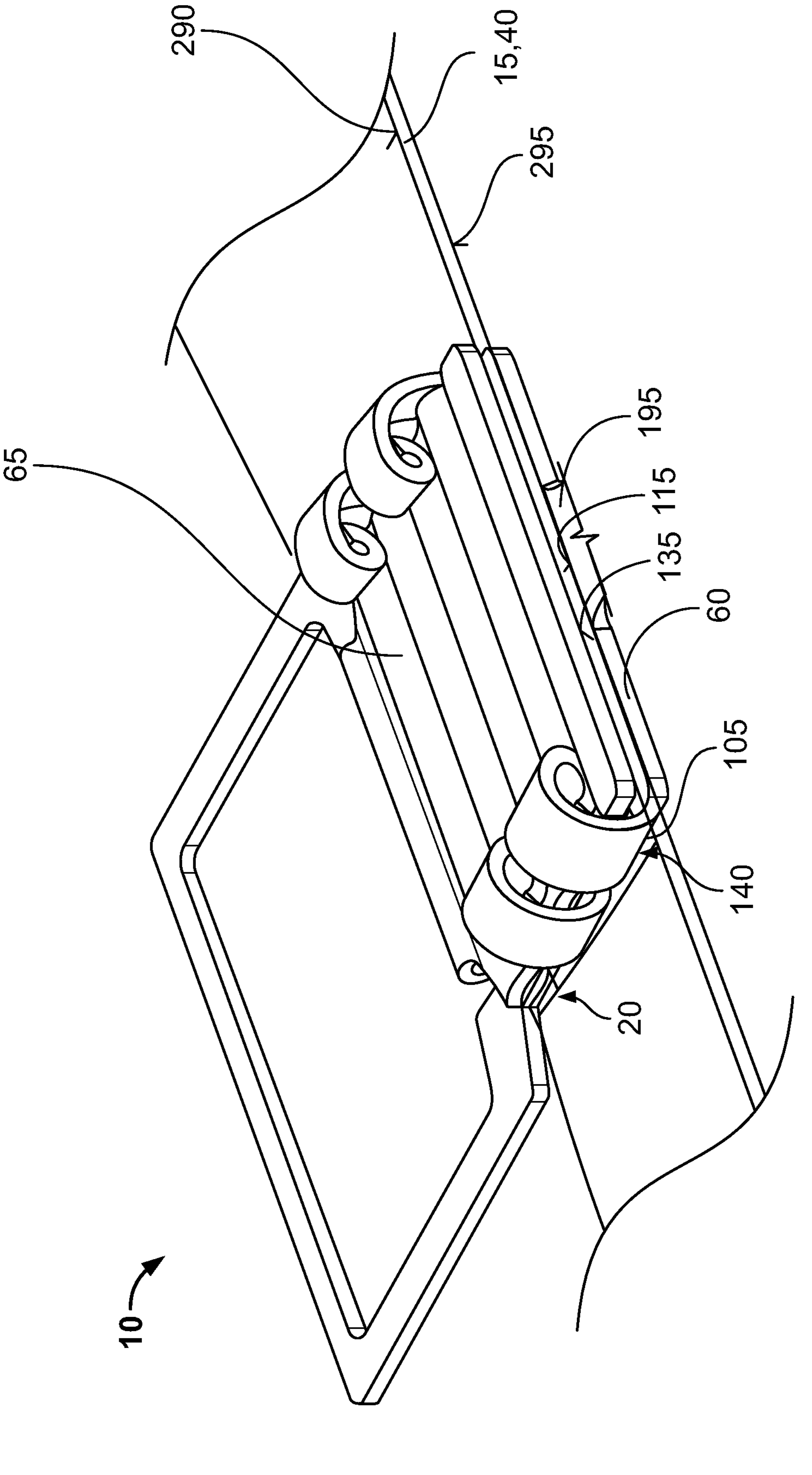
FIG. 6 is a perspective view of the system in a mounted state.

The system 10 is shown in a mounted state in FIG. 6. In this case, the fabric-contact device 20 is separated from the transport strip 200 at the connection section 195. The fabric 15 is arranged between the first contact face 115 and the second contact face 135. In this case, the fabric 15 lies with a fabric upper side 290 on the second contact face 135 and with a fabric underside 295 on the first contact face 115. In this case, the first yarn 40 can form an electrical contact with the respective contact face 115, 135 on the fabric upper side 290 and/or on the fabric underside 295. In order to keep a contact resistance between the fabric 15 and the fabric-contact device 20 particularly low, it is expedient if the first yarn 40 has both an electrical contact with the second contact face 135 on the fabric upper side 290 and an electrical contact with the first contact face 115 on the fabric underside 295.

In the first position, the second contact section 65 is folded against the first contact section 60, the second contact section 65 running parallel to the first contact section 60, as shown in FIG. 6. The retaining device 140 engages behind the second contact section 65 on the rear side and affixes the second contact section 65 to the first contact section 60 and prevents the second contact section 65 from bending up about the pivot axis 75 after insertion of the fabric 15.

Figure 7:
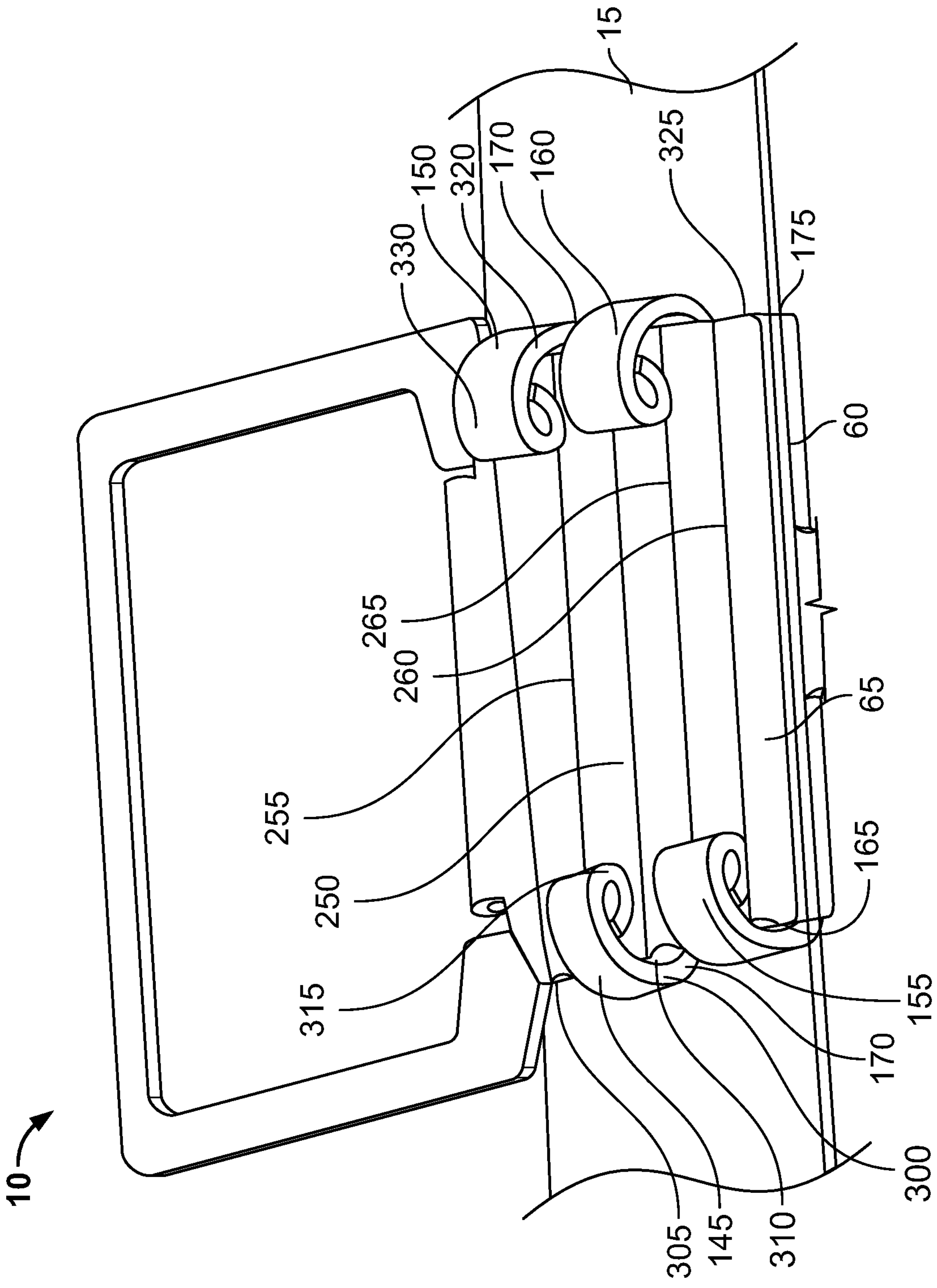
FIG. 7 is another perspective view of the system.

As shown in FIG. 7, in an affixed state of the fabric-contact device 20 on the fabric 15, a first section 300 of the first retaining element 145, which adjoins the first fixed end 170 of the first retaining element 145, is guided laterally past a fourth side 305 of the second contact section 65 facing the second side 165. In this case, a gap 310 can be provided between the first retaining element 145 and the fourth side 305 of the second contact section 65. The first section 300 can also bear against the fourth side 305. The second side

165 and the fourth side 305 run in parallel and are arranged above one another. As a result, the first contact section 60 and the second contact section 65 have the same maximum extent in the transverse direction.

The first indentation 250 and at least the second indentation 255 (and in an embodiment all the indentations 250, 255, 260, 265) extend between the fourth side 305 of the second contact section 65 and a fifth side 325 of the second contact section 65 facing the third side 175 and are formed in an elongate manner. As shown in FIG. 7, a second section 315 adjoining the first section 300 on the upper side, which second section 315 extends as far as the tip 230 of the first retaining element 145, is arranged on the upper side of the second contact section 65 and engages behind the second contact section 65. In this case, the second section 315 engages with the first indentation 250 at least in sections. The second section 315 can be molded, for example, in a crimping operation by a crimper. In this case, the second section 315 extends in the transverse direction in the direction of the third side 175 and thus also in the direction of the second retaining element 150 and of the fourth retaining element 160.

In the embodiment shown in FIG. 7, the first section 300 and the second section 315 are formed in a curved manner. Of course, it is also conceivable for the first section 300 to run substantially perpendicular to the first contact face 115 and for the second section 315 to run substantially parallel to the first contact face 115. This arrangement also can be produced by a crimping method, for example.

The configuration shown in FIG. 7 has the advantage that the curved configuration of the first section 300 and of the second section 315, in particular of the second section 315 guided substantially through 360°, forms a type of spiral spring, with which the second contact section 65 is pushed in the direction of the first contact section 60. This configuration makes sure that, on the one hand, there is a low contact resistance between the first yarn 40 and the contact faces 115, 135. In addition, as a result, a clamping action of the contact faces 115, 135 with respect to the fabric 15 can, however, also be ensured, so that unintentional slippage of the fabric 15 out of a clamping region between the first and second contact faces 115, 135 can be avoided reliably.

In order to ensure particularly good affixing of the second contact section 65 to the first contact section 60, the second retaining element 150 is also guided laterally past the fifth side 325 of the second contact section 65 by a third section 320 of the second retaining element 150. The fifth side 325 is arranged parallel to the fourth side 305. The fifth side 325 is arranged on a side of the second contact section 65 facing the third side 175. The fifth side 325, in an embodiment, is arranged above the third side 175 in the vertical direction. The third section 320 in this case borders the second fixed end 180 of the second retaining element 150.

As shown in FIG. 7, a fourth section 330 of the second retaining element 150, arranged on a side remote from the second fixed end 180, is formed in a curved manner and rolled through 360°. In this case, the fourth section 330 engages with the second indentation 255 of the second contact section 65. The fourth section 330 extends in the direction of the fourth side 305 and of the first and third retaining elements 145, 155.

Likewise, the third and fourth retaining elements 155, 160 engage around the second contact section 65 and engage with the respectively assigned third and fourth indentations 260, 265, as shown in FIG. 7. By the offset engagement of the retaining elements 145, 150, 155, 160 with the indentations 250, 255, 260, 265, 275 arranged offset in the longitudinal direction in each case, a reliable connection to the first contact section 60 can be ensured on both sides of the second contact section 65. In this case, the first section 300 (and the third retaining element 155) engages through the first notch 100 and the third section 320 (and the fourth retaining element 160) engages through the second notch 105 of the fabric 15. As a result, the fabric 15 is additionally connected to the fabric-contact device 20 in a form-fitting manner. Furthermore, as a result, electrical contact between the retaining element 145, 150, 155, 160 and the second electrode 85 and/or the second secondary electrode 90 is avoided.

Figure 8:
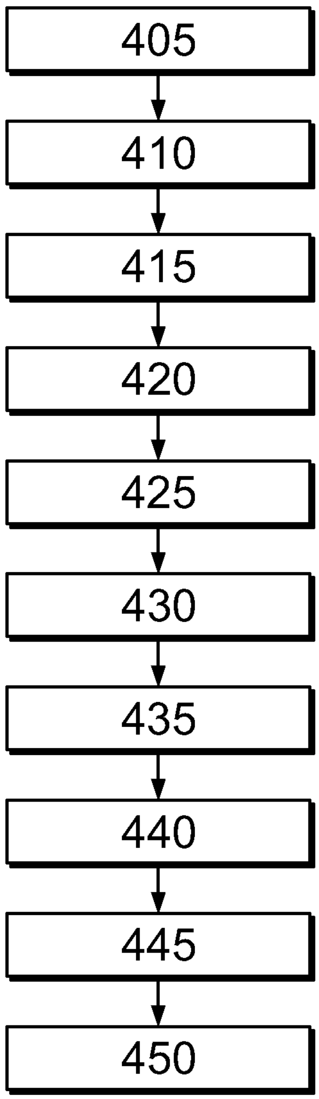
FIG. 8 is a flowchart of a method for producing the system.
Figure 9:
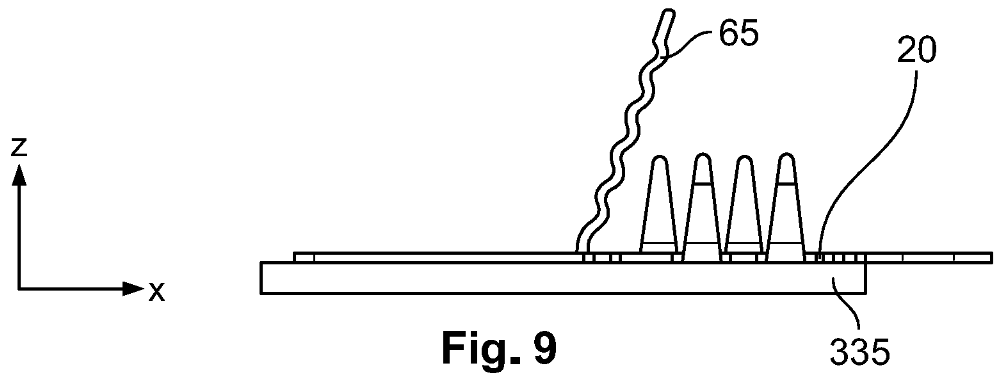
FIG. 9 is a side view of the fabric-contact device during a first method step.
Figure 10:
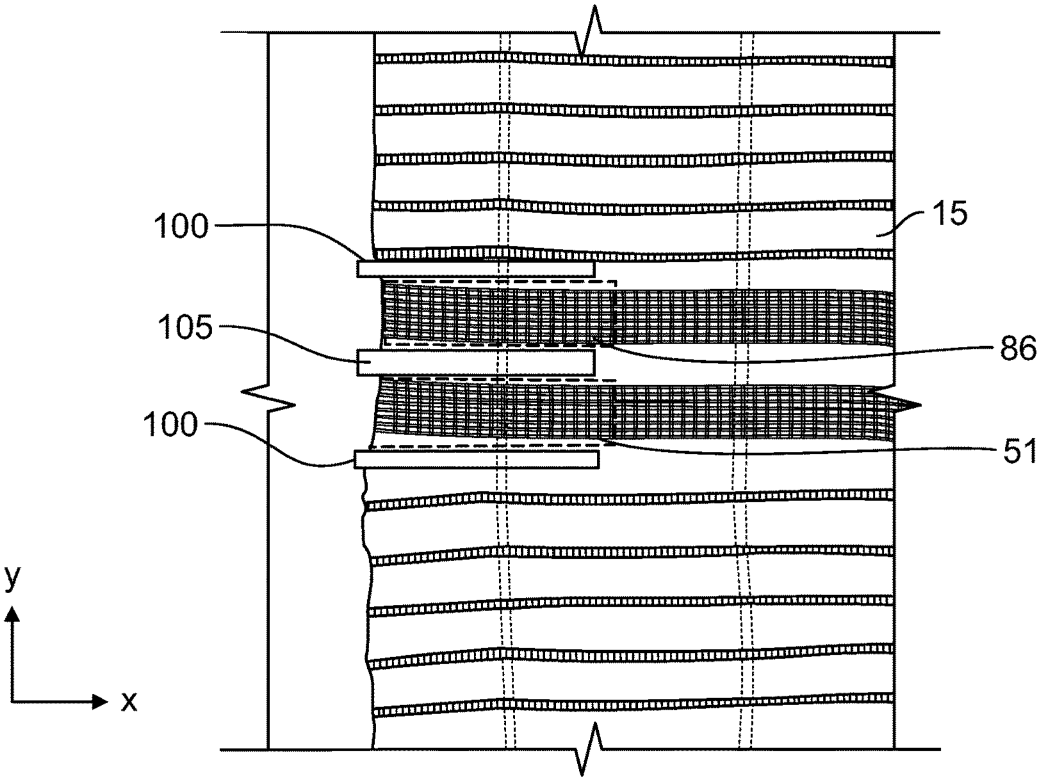
FIG. 10 is a plan view of the fabric after a second method step.
Figure 11:
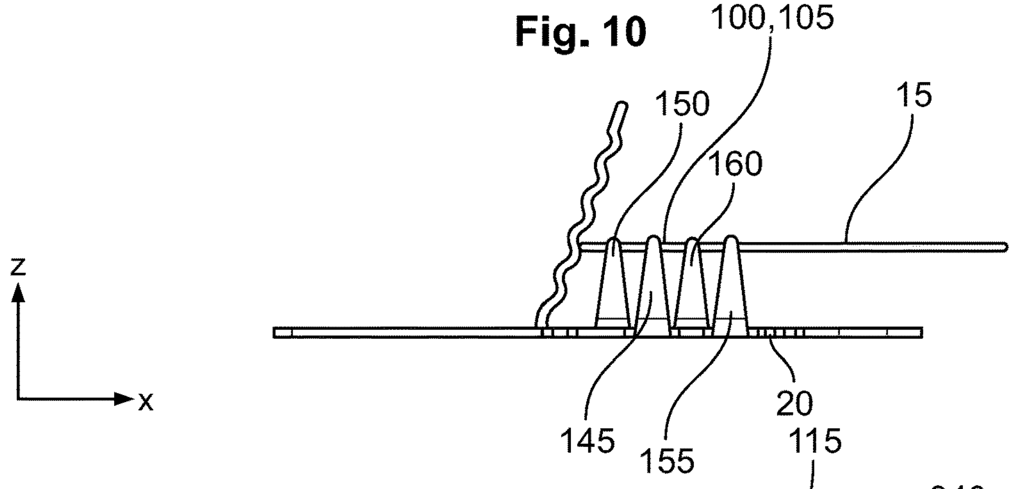
FIG. 11 is a side view of the system during a third method step.
Figure 12:
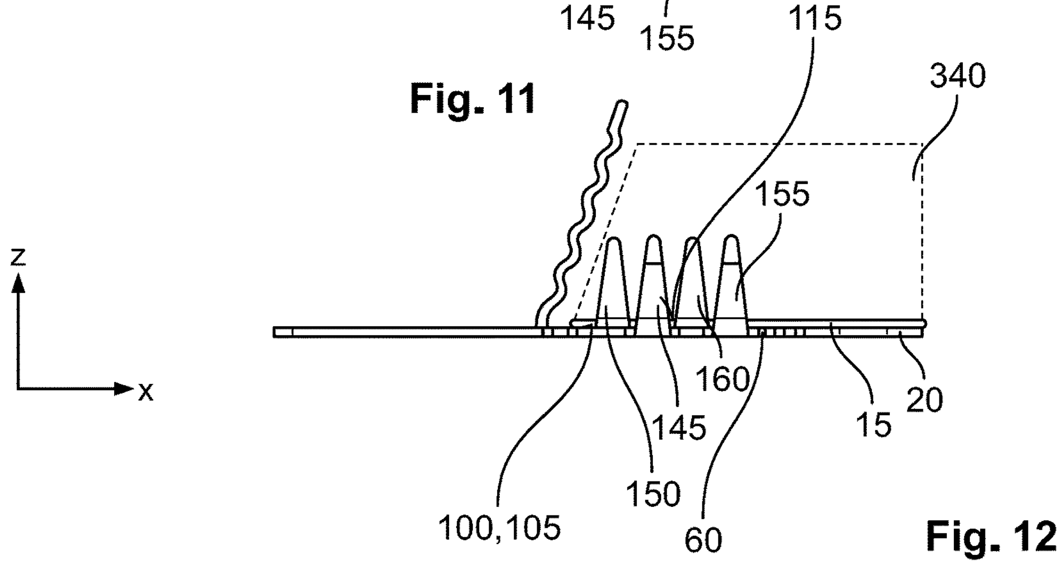
FIG. 12 is a side view of the system during a fourth method step.
Figure 13:
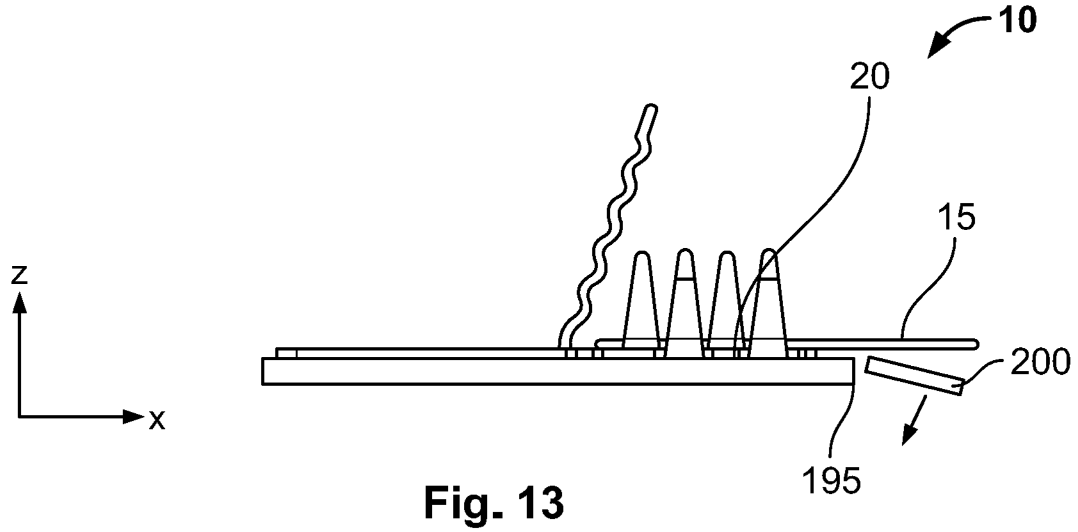
FIG. 13 is a side view of the system during a fifth method step.
Figure 14:
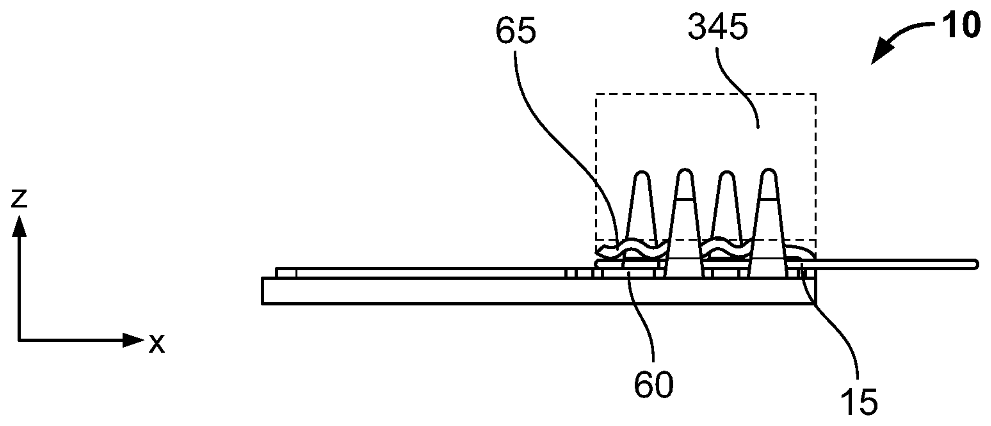
FIG. 14 is a side view of the system during a sixth method step.
Figure 15:
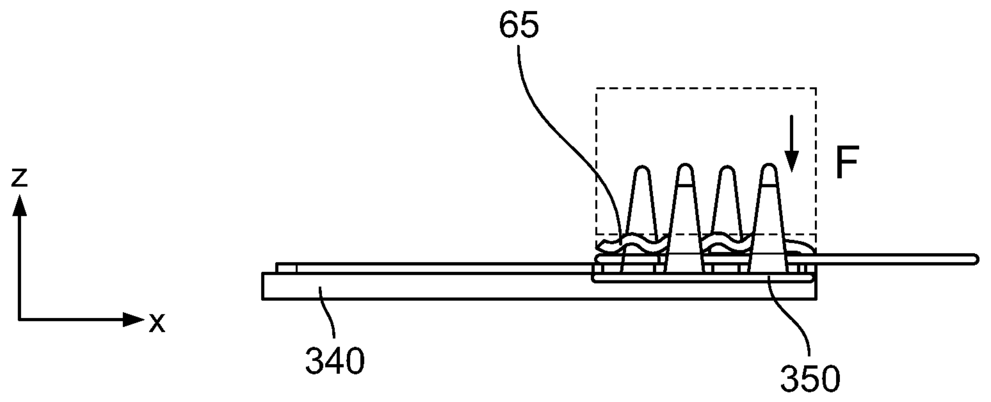
FIG. 15 is a side view of the system during a seventh method step.
Figure 16:
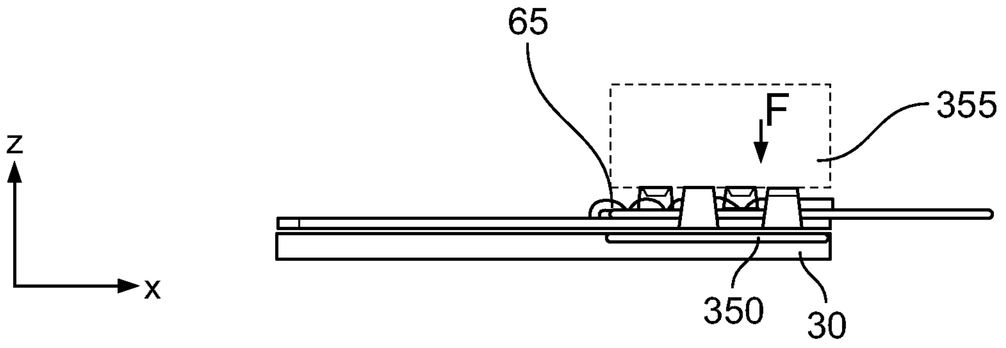
FIG. 16 is a side view of the system during an eighth method step.
Figure 17:
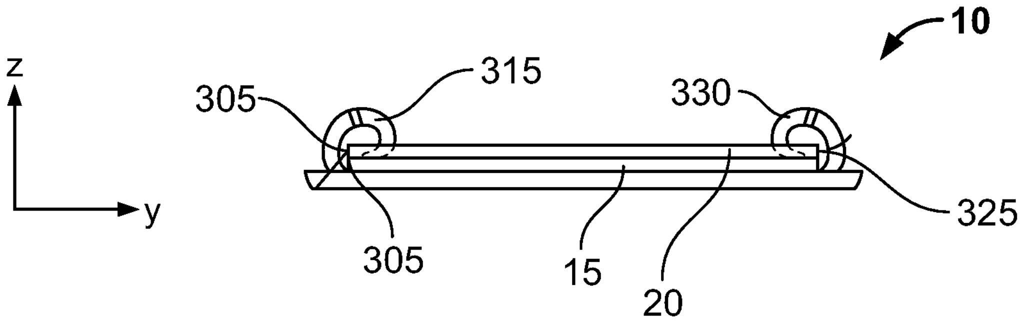
FIG. 17 is a front view of the system during after the eighth method step.
Figure 18:
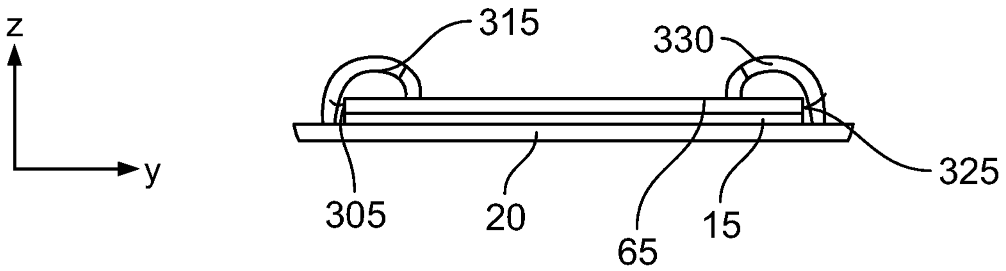
FIG. 18 is a front view of a variant of the system after the eighth method step.
Figure 19:
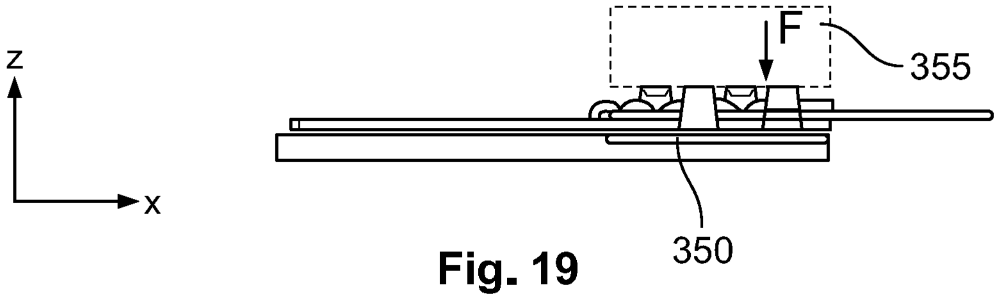
FIG. 19 is a side view of the system during a ninth method step.

FIG. 8 shows a flowchart of a method for producing the system 10 shown in FIGS. 1 to 7. FIG. 9 shows a lateral view of the fabric-contact device 20 during a first method step 405. FIG. 10 shows a plan view of the fabric 15 after a second method step 410. FIG. 11 shows a lateral view of the system 10 during a third method step 415. FIG. 12 shows a lateral view of the system 10 during a fourth method step 420. FIG. 13 shows a lateral view of the system 10 during a fifth method step 425. FIG. 14 shows a lateral view of the system 10 during a sixth method step 430. FIG. 15 shows a lateral view of the system 10 during a seventh method step 435. FIG. 16 shows a lateral view of the system 10 during an eighth method step 440. FIG. 17 shows a cutout of a front view of the system 10 after the eighth method step 440. FIG. 18 shows a cutout of a front view of a variant of the system 10 after the eighth method step 440. FIG. 19 shows a lateral view of the system 10 during a ninth method step 445.

In the first method step 405 of FIG. 8, the fabric-contact device 15 is positioned on an anvil 335 of a manufacturing machine as shown in FIG. 9. In this case, the second contact section 65 is situated in the second position.

In the second method step 410, the notch(es) 100, 105 is/are introduced into the fabric 15 laterally with respect to the first and/or second fabric-contact region 51, 86, for example by a stamping operation, as shown in FIG. 10. In this case, one or more secondary electrodes 55, 90 can be interrupted by the notch 100, 105, so that the respective secondary electrode 55, 90 is deactivated. The notch 100, 105 can have, for example, a width of 3 mm in the transverse direction and a longitudinal extent of 15 mm.

In the third method step 415 shown in FIG. 8 following the second method step 410, the fabric 15 is positioned in such a way in relation to the fabric-contact device 20 that the first notch 100 is positioned above the first and third retaining elements 145, 155 and the second notch 105 is positioned above the second and fourth retaining elements 150, 160, as shown in FIG. 11.

In the fourth method step 420 following the third method step 415, the fabric 15 is pushed onto the first contact section 60 by a first tool 340, for example, so that the fabric 15 lies on the underside of the first contact face 115, as shown in FIG. 12. In this case, the retaining element 145, 150, 155, 160 engages through the respectively assigned notch 100, 105.

In the fifth method step 425 following the fourth method step 420 shown in FIG. 8, the fabric-contact device 20 is separated from the transport strip 200 at the connection section 195 as shown in FIG. 13, for example by stamping.

In the sixth method step 430, which follows the fifth method step 425, the second contact section 65 is bent from the second position into the first position by a second tool 345, as shown in FIG. 14. As a result, the first and the second contact section 60, 65 are arranged parallel to one another and the fabric 15 is arranged between the two contact sections 60, 65.

In the seventh method step 435 following the sixth method step 430, the anvil 340 is heated to a predefined temperature, at least in a subregion 350 shown in FIG. 15 below the fabric-contact device 20, by heating device. The predefined temperature is greater than a melting temperature of the second yarn 45 and, in an embodiment, is greater than a melting temperature of the soldering agent. In this regard, the subregion 350 is heated to a temperature of approximately 250° C., at least greater than 232° C. As a result, the second substance of the second yarn 45 and the third substance of the soldering agent fuse. By way of a retaining force F acting perpendicularly on the contact faces 115, 135, the second contact section 65 is pushed back in the direction of the first contact section 60 and the second substance is displaced at least partially between the bulge 270 and the first contact face 115, so that the second contact face 135 and the first contact face 115 have direct contact to the first yarn 40. Upon contact between the first contact face 115 and the first yarn 40 and also upon contact between the first yarn 40 and the second contact face 120, the third substance forms a material connection, in particular a soldered connection. Furthermore, the second substance flows upwards into the further indentation 275 and into the first recess(es) 125 in the first contact face 115.

In the eighth method step 440, carried out at least partially chronologically parallel to the seventh method step 435, the retaining element 145, 150, 155, 160 is recrimped by a stamp 355 shown in FIG. 16 in such a way that the retaining element 145, 150, 155, 160 engages behind the second contact section 65 on the upper side. The retaining force F can be provided by the stamp 355 rather than by the second tool 345.

In this case, as shown in FIG. 17, the second section 315 can be arranged directly bordering the fourth side 305 and/or the fourth section 330 can be arranged directly bordering the fifth side 325 or, as depicted in FIG. 18, the second section 315 and/or the fourth section 330 (further with respect to FIG. 17) can be arranged to be inwardly offset in relation to the respective fourth and fifth sides 305, 325.

In a ninth method step 445 shown in FIG. 8, the subregion 350 is cooled down, so that the system 10, in particular the fused second and/or third substance, is actively cooled by the subregion 350 and solidifies particularly rapidly. The retaining force F is maintained further.

In a tenth method step 450 shown in FIG. 8 following the ninth method step 445, the retaining force F is withdrawn and the completely contacted system 10 is removed from the manufacturing machine.

In an embodiment, two fabric-contact devices 20 are positioned simultaneously in the manufacturing machine in such a way that one fabric-contact device 20 contacts the first fabric-contact region 51, and the other fabric-contact device 20 contacts the second fabric-contact region 86. As a result, the method described in FIG. 8 can be carried out particularly simply and inexpensively to produce the system 10.

In another embodiment, the method steps 405 to 450 can also be carried out in a different sequence than described above. In a further embodiment, the cooling of the subregion 350 can also be omitted.

The fabric-contact device 20 can be connected to the fabric 15 in a fully automated manner. Furthermore, costly soldering for connecting the fabric-contact device 20 to an electrode of the fabric 15 can be omitted. As a result, excellent process safety for producing the system 10 from the fabric-contact device 20 and the fabric 15 is ensured. By way of the opposing arrangement of the first retaining element 145 and the second retaining element 150, a lateral bending-up of the second contact section 65 in relation to the first contact section 60 is avoided. As a result, flat bearing of the contact faces 115, 135 against the fabric 15 on both sides can be ensured. Furthermore, good clamping contact of the contact face 115, 135 on the fabric 15 can be ensured, since bending-up of the contact faces 115, 135 by the rear engagement of the retaining elements 145, 150 is reliably avoided.

What is claimed is:

1. A fabric-contact device, comprising:

a first contact section having a first contact face on a first upper side;

a second contact section having a second contact face on an underside facing the first contact section, the first contact face faces the second contact section and the first contact section is connected to the second contact section on a first side of the first contact section, the second contact section has a first indentation on a second upper side facing away from the first contact section; and a retaining device having a first retaining element connected to a second side of the first contact section at a first fixed end, the first retaining element is guided laterally past the second contact section by a first section of the first retaining element bordering the first fixed end, a second section of the first retaining element bordering the first section of the first retaining element on a side opposite the first fixed end engages behind the second contact section in the first indentation and affixes the second contact section to the first contact section.

2. The fabric-contact device of claim 1, wherein a fabric with an electrically conductive yarn is arranged between the first contact face and the second contact face, the first contact face and/or the second contact face contact the electrically conductive yarn.

3. The fabric-contact device of claim 1, wherein a hinge is disposed between and connects the first contact section and the second contact section, the second contact section can be pivoted between a first position folded against the first contact section and a second position away from the first contact section.

4. The fabric-contact device of claim 1, wherein the first retaining element tapers from the first fixed end to a tip of the first retaining element.

5. The fabric-contact device of claim 1, wherein the second contact face has a wave profile, the first contact section is formed in a plate-shaped manner, and/or the first contact face is formed in a substantially planar manner.

6. The fabric-contact device of claim 1, wherein the retaining device has a second retaining element connected to a third side of the first contact section by a second fixed end, the second retaining element is guided laterally past the second contact section by a third section of the second retaining element bordering the second fixed end.

7. The fabric-contact device of claim 6, wherein a fourth section of the second retaining element bordering the third section of the second retaining element on a side opposite the second fixed end engages behind the second contact section and affixes the second contact section to the first contact section.

8. The fabric-contact device of claim 7, wherein the second side of the first contact section is arranged opposite the third side of the first contact section and the first side of the first contact section is arranged between the second side of the first contact section and the third side of the first contact section.

9. The fabric-contact device of claim 8, wherein the second section of the first retaining element extends in a direction of the second retaining element and the fourth section of the second retaining element extends in a direction of the first retaining element.

10. The fabric-contact device of claim 7, wherein the second contact section has a second indentation arranged offset in relation to the first indentation on the second upper side of the second contact section.

11. The fabric-contact device of claim 10, wherein the first indentation and the second indentation extend between a fourth side of the second contact section facing the second side of the first contact section and a fifth side of the second contact section facing the third side of the first contact section, the first indentation and the second indentation are formed in an elongate manner.

12. The fabric-contact device of claim 11, wherein the second indentation is parallel to the first indentation, the fourth section of the second retaining element engages with the second indentation.

13. The fabric-contact device of claim 2, wherein the second contact section has a pair of bulges arranged parallel to one another and spaced apart from one another on the underside.

14. The fabric-contact device of claim 13, wherein a further indentation arranged between the bulges receives a substance of a second yarn of the fabric.

15. The fabric-contact device of claim 1, further comprising an adjoining section connected to the first side of the first contact section, the adjoining section can be electrically connected to an electrical conductor of an electrical cable.

16. The fabric-contact device of claim 15, wherein the adjoining section circumferentially delimits a recess, a frame width of the adjoining section is smaller than a maximum extent of the recess in at least one spatial direction.

17. A system, comprising:

a fabric having a first electrode with an electrically conductive contact region; and a fabric-contact device including:

- a first contact section having a first contact face on a first upper side;
- a second contact section having a second contact face on an underside facing the first contact section, the first contact face faces the second contact section and the first contact section is connected to the second contact section on a first side of the first contact section, the second contact section has a first indentation on a second upper side facing away from the first contact section; and
- a retaining device having a first retaining element connected to a second side of the first contact section at a first fixed end, the first retaining element is guided laterally past the second contact section by a first section of the first retaining element bordering the first fixed end, a second section of the first retaining element bordering the first section on a side opposite the first fixed end engages behind the second contact section in the first indentation and affixes the second contact section to the first contact section, the electrically conductive contact region of the first electrode is arranged between the first contact section and the second contact section, the first section of the first retaining element of the first retaining element engages through the fabric and mechanically connects the fabric to the fabric-contact device.

18. The system of claim 17, wherein the fabric has a first yarn and a second yarn, the first yarn has an electrically conductive substance and the second yarn has an electrically insulating substance.

19. The system of claim 18, wherein the fabric has a first fabric section, a second fabric section, and a third fabric section and, to form the first electrode, the first yarn and the second yarn are interwoven with one another in the first fabric section.

20. The system of claim 19, wherein, to form a second electrode, the first yarn and the second yarn are interwoven with one another in the third fabric section arranged spaced apart from the first fabric section, only the second yarn is interwoven in the second fabric section arranged between the first fabric section and the third fabric section.

21. The system of claim 20, wherein the second fabric section electrically insulates the first fabric section from the third fabric section, the fabric-contact device is arranged spaced apart from the second electrode, a notch is introduced in the second fabric section, and the first section of the first retaining element engages through the notch.

22. A method, comprising:

providing the fabric-contact device and the fabric of claim 17;

positioning the second contact section in a second position;

positioning the electrically conductive contact region of the first electrode above the first contact section;

pushing the first retaining element through the fabric with the first section of the first retaining element engaging the fabric;

pivoting the second contact section from the second position into a first position in which the electrically conductive contact region is between the first contact face and the second contact face and electrically connected with at least one of the first contact face and the second contact face; and crimping the second section of the first retaining element.

23. The method of claim 22, wherein the fabric-contact device is heated above a melting temperature and/or a glass-transition temperature of a substance of a yarn of the fabric, the yarn is fused between the first contact section and the second contact section.

24. The method of claim 23, wherein the substance of the yarn of the fabric in a molten state is displaced by a bulge of the second contact section, the substance flows into a second indentation of the second contact section adjacent to the bulge and is cured in the second indentation.

* * * * *